US011391889B2

(12) United States Patent
Labroille et al.

(10) Patent No.: US 11,391,889 B2
(45) Date of Patent: Jul. 19, 2022

(54) MONOLITHIC CAVITY FOR LIGHT MANIPULATION

(71) Applicant: CAILabs, Rennes (FR)

(72) Inventors: Guillaume Labroille, Rennes (FR); Bertrand Denolle, Rennes (FR); Olivier Pinel, Rennes (FR)

(73) Assignee: CAILabs, Rennes (FR)

( * ) Notice: Subject to any disclaimer, the term of this patent is extended or adjusted under 35 U.S.C. 154(b) by 43 days.

(21) Appl. No.: 16/959,067

(22) PCT Filed: Dec. 17, 2018

(86) PCT No.: PCT/EP2018/085177
§ 371 (c)(1),
(2) Date: Jun. 29, 2020

(87) PCT Pub. No.: WO2019/129518
PCT Pub. Date: Jul. 4, 2019

(65) Prior Publication Data
US 2020/0333532 A1    Oct. 22, 2020

(30) Foreign Application Priority Data

Dec. 29, 2017  (FR) ...................................... 1763382

(51) Int. Cl.
*G02B 6/26* (2006.01)
*G02B 17/00* (2006.01)
*G02B 27/09* (2006.01)

(52) U.S. Cl.
CPC ............. *G02B 6/26* (2013.01); *G02B 17/004* (2013.01); *G02B 27/0927* (2013.01); *G02B 27/0977* (2013.01)

(58) Field of Classification Search
CPC ..... G02B 6/26; G02B 17/004; G02B 27/0927; G02B 27/0977
See application file for complete search history.

(56) References Cited

U.S. PATENT DOCUMENTS

| 6,008,920 A | * | 12/1999 | Hendrix | ............... | G02B 6/2938 |
| | | | | | 359/633 |
| 6,167,171 A | * | 12/2000 | Grasis | .................. | G02B 6/2938 |
| | | | | | 385/24 |

(Continued)

FOREIGN PATENT DOCUMENTS

WO    2017/158261 A1    9/2017

OTHER PUBLICATIONS

Consoli, A. and López, C. Lasing optical cavities based on macroscopic scattering elements. Sci. Rep. 7, 40141; doi: 10.1038/srep40141 (2017). (Year: 2017).*

(Continued)

*Primary Examiner* — Peter Radkowski
(74) *Attorney, Agent, or Firm* — TraskBritt

(57) ABSTRACT

A device for manipulating a light radiation by reflecting the light radiation multiple times on at least two reflecting surfaces of a monolithic block made of homogenous transparent material comprises a first and second zone on surfaces of the block for injecting the light radiation to be manipulated, and for extracting the light radiation after manipulation. At least one of the reflective surfaces is micro-structured to impart a determined spatial phase transformation.

14 Claims, 3 Drawing Sheets

(56) References Cited

U.S. PATENT DOCUMENTS

| | | | |
|---|---|---|---|
| 6,198,864 B1* | 3/2001 | Lemoff | G02B 6/29367 385/24 |
| 6,272,269 B1* | 8/2001 | Naum | G02B 6/0026 362/551 |
| 6,370,166 B1* | 4/2002 | Akaoka | G02B 26/06 372/20 |
| 6,392,807 B1* | 5/2002 | Barbarossa | G02B 6/2861 359/577 |
| 6,396,978 B1* | 5/2002 | Grann | G02B 6/29358 385/24 |
| 6,501,877 B1* | 12/2002 | Weverka | G02B 6/29307 385/31 |
| 6,563,976 B1* | 5/2003 | Grann | G02B 6/29311 385/24 |
| 6,577,445 B1* | 6/2003 | Damask | G02B 5/3083 359/489.12 |
| 6,751,379 B2* | 6/2004 | Capewell | G02B 6/29367 385/31 |
| 6,768,834 B1* | 7/2004 | Gruhlke | G02B 3/0031 385/129 |
| 6,826,349 B2* | 11/2004 | Weverka | G02B 6/29307 359/211.1 |
| 6,859,320 B2* | 2/2005 | Yeh | G02B 5/284 356/454 |
| 6,868,205 B2* | 3/2005 | Weverka | G02B 6/29307 385/31 |
| 6,941,047 B2* | 9/2005 | Capewell | G02B 6/29367 385/33 |
| 6,941,072 B2* | 9/2005 | Wu | G02B 6/29367 398/83 |
| 6,975,789 B2* | 12/2005 | Weverka | G02B 6/29307 359/211.1 |
| 8,488,244 B1* | 7/2013 | Li | G02B 6/4215 359/618 |
| 2002/0057868 A1* | 5/2002 | Wu | H04J 14/0213 385/24 |
| 2002/0064191 A1* | 5/2002 | Capewell | G02B 6/29367 372/14 |
| 2002/0076480 A1* | 6/2002 | Hsieh | G02B 6/29385 427/8 |
| 2002/0181861 A1* | 12/2002 | Shroder | G01J 3/02 385/31 |
| 2003/0002101 A1* | 1/2003 | Kropp | G02B 6/29367 398/79 |
| 2003/0053214 A1* | 3/2003 | Yeh | G02B 26/001 359/577 |
| 2003/0053749 A1* | 3/2003 | Weverka | H04J 14/0291 385/24 |
| 2004/0005115 A1* | 1/2004 | Luo | G02B 6/29383 385/24 |
| 2004/0013361 A1* | 1/2004 | Chen | G02B 6/29358 385/31 |
| 2004/0042736 A1* | 3/2004 | Capewell | G02B 6/4215 385/89 |
| 2004/0101247 A1* | 5/2004 | Chen | G02B 6/32 385/47 |
| 2004/0141681 A1* | 7/2004 | Weverka | G02B 6/29307 385/18 |
| 2004/0141687 A1* | 7/2004 | Weverka | G02B 6/2931 385/36 |
| 2004/0165828 A1* | 8/2004 | Capewell | G02B 6/29367 385/47 |
| 2007/0030567 A1* | 2/2007 | Froehlich | G02B 6/2938 359/577 |
| 2010/0277803 A1* | 11/2010 | Pockett | G02B 27/4205 359/567 |
| 2013/0094807 A1* | 4/2013 | Shao | G02B 6/4206 385/33 |
| 2014/0226934 A1* | 8/2014 | Panotopoulos | G02B 6/2817 385/48 |
| 2015/0117823 A1* | 4/2015 | Panotopoulos | G02B 6/2817 385/89 |
| 2015/0125163 A1* | 5/2015 | Gui | G02B 6/29367 398/201 |
| 2015/0311995 A1* | 10/2015 | Wang | H04Q 11/0005 398/49 |
| 2016/0246008 A1* | 8/2016 | Tan | G02B 6/29365 |
| 2017/0285269 A1* | 10/2017 | Yue | H04J 14/02 |
| 2018/0052284 A1* | 2/2018 | Matres | G02B 6/29367 |

OTHER PUBLICATIONS

Chang Yang and Elias Towe, "Ultra-compact grating-based monolithic optical pulse compressor for laser amplifier systems," J. Opt. Soc. Am. B 33, 2135-2143 (2016) (Year: 2016).*

Bugaychuk et al., Enhanced Nonlinear Optical Effect in Hybrid Liquid Crystal Cells Based on Photonic Crystal, Nanoscale Research Letters (2017) 12:449, DOI 10.1186/s11671-017-2217-3 (Year: 2017).*

Kruger et al., Birefringence Measurements on Crystalline Silicon, Class. Quantum Grav. 33 (2016) 015012, arXiv:1504.06503v1 [physics.optics] Apr. 24, 2015 (Year: 2015).*

International Search Report for International Application No. PCT/EP2018/085177 dated Apr. 3, 2019, 4 pages.

International Written Opinion for International Application No. PCT/EP2018/085177 dated Apr. 3, 2019, 5 pages.

Labroille et al., Mode Selective 10-Mode Multiplexer Based on Multi-Plane Light Conversion, 2016 Optical Fiber Communications Conference and Exhibition, (Mar. 20, 2016), 3 pages.

* cited by examiner

MONOLITHIC CAVITY FOR LIGHT MANIPULATION

CROSS-REFERENCE TO RELATED APPLICATIONS

This application is a national phase entry under 35 U.S.C. § 371 of International Patent Application PCT/EP2018/085177, filed Dec. 17, 2018, designating the United States of America and published as International Patent Publication WO 2019/129518 A1 on Jul. 4, 2019, which claims the benefit under Article 8 of the Patent Cooperation Treaty to French Patent Application Serial No. 17/63382, filed Dec. 29, 2017.

TECHNICAL FIELD

The present disclosure relates to a device for manipulating a light radiation by a succession of spatial phase modifications, each followed by a free propagation of the light radiation.

The technical field of the present disclosure concerns an integrated compact optical device to manipulate a light radiation.

BACKGROUND

In the document G. Labroille, P. Jian, N. Barre, B. Denolle, and J. Morizur, "Mode Selective 10-Mode Multiplexer based on Multi-Plane Light Conversion," in Optical Fiber Communication Conference, OSA Technical Digest (online) (Optical Society of America, 2016), paper Th3E.5, an embodiment of an optical device for manipulating a light radiation is realized in the form of a multi-pass cavity. The cavity is formed by a mirror and a single reflective phase plate. The successive phase profiles for manipulating the light radiation are all printed on the single reflective phase plate. The light radiation is injected from a single-mode fiber array forming an input stage of the device, then reflected several times between the phase plate and the mirror, finally extracted from an output multi-mode fiber forming an output stage of the device.

In order to get a functional optical device, all the components are disposed on a common support with very high precision in their positions and orientations. A classical process for assembling such a device uses firstly adjustable mirror holders or phase plate mounts to reach an optimal position and then fixes this optimal position by a bonding process, e.g., using UV adhesives. More precisely, the mirror and the phase plate are assembled in parallel position on the support to form a cavity. An incident light radiation is injected from the fiber of the input stage into the cavity thus formed, and the intensity of the light radiation is detected at the output of the cavity. The relative position and orientation between the different components are finely adjusted in all available degrees of freedom to maximize the detected light output intensity. This optimal relative position and orientation is temporarily frozen by the mirror holders and the mounts of the phase plate. Finally, an adhesive layer is applied to fix the optimal positions of the components relative to the support.

Such a method has certain effectiveness, however it suffers from several drawbacks. The components interacting several times with the light field, such as the mirror and the phase plate, require a very precise position, orientation and stability. A minimum deviation from the required position or orientation can influence largely the precision of alignment and have a great impact on the proper function of the device.

The adhesive has certain limitations due to its thermal expansion coefficient. Since the thermal expansion of the adhesive is different from that of the optical components, there is a variation of the alignment as a function of the temperature. Thus, a device that is assembled by adhesives is sensitive to temperature variations. In addition, it is possible to encounter a detachment when the adhesive is not well applied or used in severe conditions.

BRIEF SUMMARY

The present disclosure aims to overcome the aforementioned drawbacks in improving the stability and the resistance by a compact structure. Yet a further purpose of the present disclosure is to simplify the alignment of the optical components forming the device. Finally, the present disclosure allows a high-volume manufacturing of the optical device.

In order to achieve one of these aims, the object of the present disclosure relates to a device for manipulating a light radiation by reflecting the light radiation multiple times on at least two reflecting surfaces of a monolithic block made of homogenous transparent material, the device comprising:
- a first zone on one surface of the block for injecting the light radiation to be manipulated,
- a second zone on one surface of the block for extracting the light radiation after manipulation, and
- at least one of the reflective surfaces being micro-structured to impart a determined spatial phase transformation on the light radiation.

Such a configuration makes it possible to avoid the use of adhesive on reflecting parts, the phase manipulation and the reflections being carried out by way of a single element. Such a configuration also has the advantage of requiring fewer joining surfaces than a device comprising reflecting mirrors. The accuracy of the position, the orientation and the stability of reflecting surfaces of a monolithic block, as well as ease of assembly, is improved compared to reflecting mirrors.

According to other advantageous and non-limiting features of the present disclosure, the following characteristics can be taken alone or in any technically feasible combination:
- the first and the second zones are separated and interchangeable;
- the first and the second zones are merged into a unique one;
- the first and the second zones are disposed on the same surface of the block;
- the first and the second zones are disposed on different surfaces of the block;
- the first zone and the second zone are each configured to be in tilted positions with an angle alpha relative to the reflective surface in order to have a zero incident angle for injecting the light radiation injecting to, and a zero output angle for extracting the light radiation from the monolithic block;
- the first zone and/or the second zone is (are) configured to be aligned with the reflective surface in order to have a nonzero incident angle for the light radiation injecting inside the monolithic block so that the different wavelengths of light radiations are separated due to the chromatic dispersion effect;
- comprises at least one optical fiber or fiber array assembled to the first zone and/or the second zone;

comprises at least one optical component to manipulate the size and the divergence of the light radiation out of the optical fiber;

comprises at least one optical component to manipulate the size and the divergence of the light radiation out of the optical fiber;

comprises at least one microlens to collimate the light radiation out of the optical fiber;

the at least one optical fiber is bonded to the first zone and/or second zone of the monolithic block and a reshaping of the light radiation out of the optical fiber is performed by the phase manipulating surface;

the at least one optical fiber is bonded to the first zone and/or second zone of the monolithic block via an intermedium;

the at least one optical fiber is bonded to the first zone and/or second zone of the monolithic block by a liquid, which has the same index of refraction as the material of the monolithic block;

the material of the monolithic block presents birefringence.

BRIEF DESCRIPTION OF THE DRAWINGS

Other advantages and characteristics will become apparent on examination of the detailed description of embodiments of the present disclosure, which are in no way limitative, and the attached diagrams, wherein.

DETAILED DESCRIPTION

To simplify the description, the same references are used for identical elements or elements providing the same function in the various exposed embodiments of the present disclosure.

For the sake of clarity, the present disclosure defines a light radiation as a radiation formed by at least one mode of the electromagnetic field, each mode comprising a space-frequency distribution of the amplitude, the phase, and the polarization of the electromagnetic field.

Consequently, the modification or the manipulation of the light radiation designates the space-frequency transformation of at least one mode of the light radiation.

The "shape" of a radiation is defined as the transverse distribution of the amplitude and the phase of the mode, or the combination of the transverse amplitude and phase distributions of the modes composing this radiation.

Figure 1:
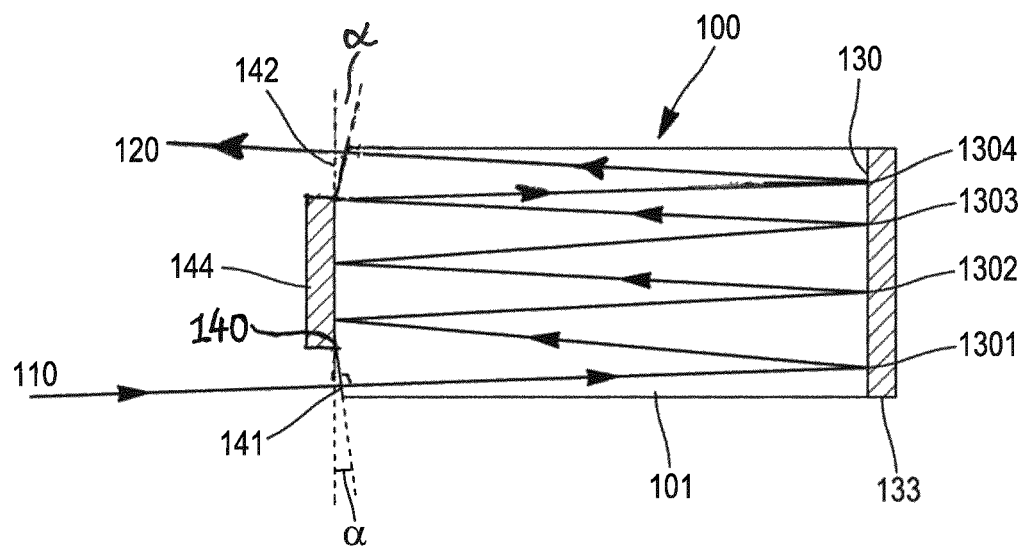
FIG. 1 is a schematic representation of a first embodiment of a device according to the present disclosure.

FIG. 1 is a schematic representation of a first non-limitative embodiment of a device for manipulating a light radiation, and, in particular, for changing the shape of the light radiation. The device (100) shown in FIG. 1 comprises a monolithic block (101) made of homogenous transparent material.

The monolithic block (101) is in the form of a parallelepiped with two parallel plane surfaces (130 and 140) covered, respectively, by two high-reflectivity coating layers (133 and 144) to form a cavity. Usually, the word "cavity" in the optical domain means an optical resonator with an arrangement of reflective surfaces, between which the light reflects multiple times producing standing waves for certain resonance frequencies. In the present description however, the meaning of cavity is more general in the sense that the light reflects multiple times and then goes out without necessarily producing standing waves inside the cavity.

The first surface (140) is covered partially by the high-reflectivity coating layer (144) for the function of reflection. The other regions not covered by the high-reflectivity coating layer (144), are covered by an antireflection coating to form, respectively, a first zone (141) for injecting the light radiation (110), and a second zone (142) for extracting the light radiation (120). The anti-reflection coating improves the light transmission efficiency and avoids the loss of light power. Between the first and second zones, the light radiation is reflected several times between the two reflective layers (133 and 144). Advantageously, the light radiation is reflected four times or more than four times, such as 8 times or more, 10 times or more, 12 or more, 14 times or more and even 20 or more times. It is also possible to have the first and second zones on two different surfaces, for example, the first zone (141) on the first surface (140) and the second zone (142) on the second surface (130). In addition, because of the reversibility of the optical path, the first and second zones are interchangeable, e.g., the second zone (142) may be used for light radiation injection, while the first zone (141) may be used for light radiation extraction.

The surface (130) is configured to be a phase manipulating surface that imparts a determined spatial phase transformation on the light radiation at each interaction, i.e., reflection. For example, the surface (130) can be microstructured at the wavelength scale, so that it can apply a modification on the spatial phase of the optical radiation. To this end, the surface (130) presents a microstructured surface at the level of each reflection position (1301, 1302, 1303 and 1304), so that each reflection position has a spatial phase profile modifying the spatial phase of the radiation.

By "microstructured surface" it is meant, for example, that the surface may be composed of "pixels" whose dimensions are between a few microns to a few hundred microns. Each pixel has an elevation, relative to an average plane defining the surface, typically up to a few micrometers or up to a few hundred of micrometers.

Microstructuring directly the surfaces of the monolithic block is particularly advantageous since it makes it possible to eliminate the problems associated with the bonding of the optical elements and their relative positioning with respect to each other.

In this embodiment, the first zone (141) is configured to be in a tilted position with an angle alpha relative to the surface (140). The tilted position can be realized, for instance, by cutting an edge on the surface (140) of the monolithic block (101). The angle alpha is chosen to such a value that the incident angle of the injecting light radiation is zero relative to the titled surface of the first zone (141). The light radiation after manipulation is extracted from the second zone (142), which is also configured to be in a tilted position with an angle alpha relative to the surface (140). The zero incident angle allows to avoid the separation of the different wavelength light radiations at the interface due to the chromatic dispersion. As a result, the radiations with different wavelengths follow the same geometrical optical path inside the cavity.

In this embodiment, the first and the second zones (141 and 142) are interchangeable for the function of injecting and extracting the light radiation. In addition, the parallelepiped form is in no way limitative. It is possible to envisage variants with any other form, defined by a plurality of surfaces, which has at least two reflective surfaces to form the cavity.

Figure 2:
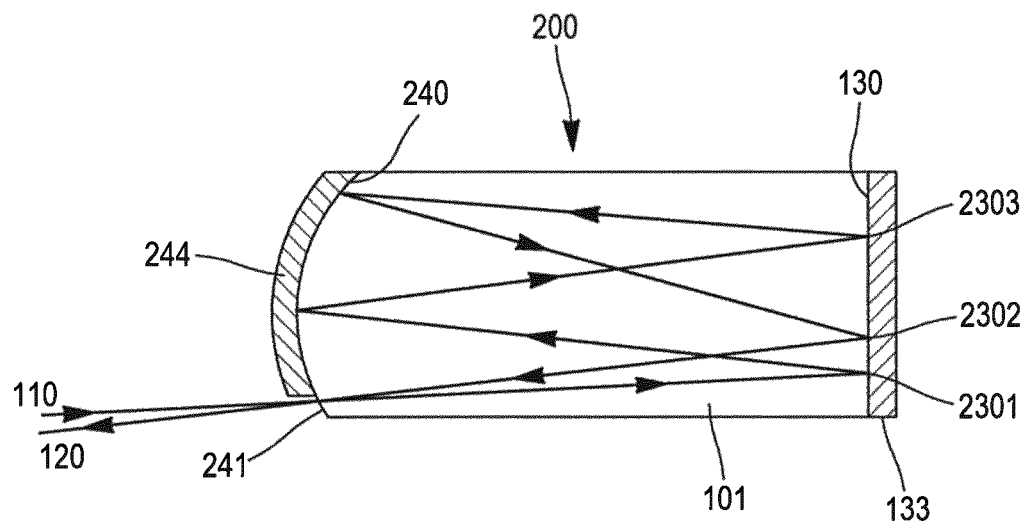
FIG. 2 is a schematic representation of a second embodiment of a device according to the present disclosure.

FIG. 2 is a schematic representation of a second non-limitative embodiment of a device for manipulating a light radiation. This embodiment is described only for its differences with respect to the first embodiment. The monolithic block (200) comprises a plane surface (130) and a concave or curved surface (240). These two surfaces are parallel and are covered, respectively, by two high-reflectivity coating layers (133 and 244) to form a cavity.

The surface (240) is covered partially by the high-reflectivity coating layer (244). The zone (241) is covered by an anti-reflection coating to form a first zone for injecting the light radiation (110), which is reflected forwardly by the plane surface (130) at the positions (2301 and 2303) and is reflected backwardly by the plane surface (130) at the position (2302). Each reflection position has a spatial phase profile to modify the spatial phase of the light radiation. Finally, the anti-reflective coated region (241) also serves as the second zone for extracting the light radiation (120) after manipulation. The concave or the curved surface (240) enables the injection light (110) and the extraction light (120) to cross the same anti-reflection coated region (241) so that the first and the second zones merge into a unique one.

In addition, in this embodiment, the incident angle of the injecting light radiation (110) is zero relative to the curved surface of the zone (241) to avoid the separation of the different wavelength light radiations due to the chromatic dispersion. As a result, the radiations with different wavelengths follow the same direction inside the monolithic block cavity.

Figure 3:
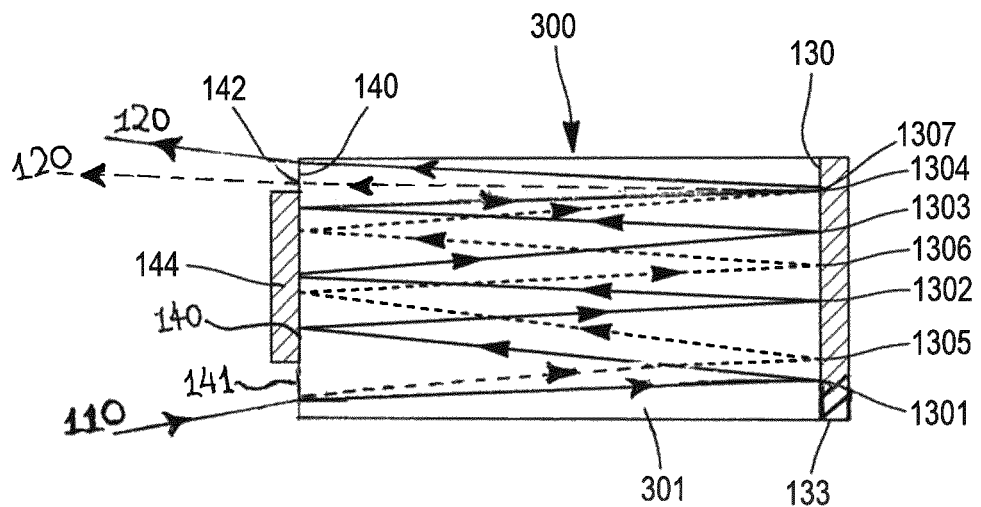
FIG. 3 is a schematic representation of a third embodiment of a device according to the present disclosure.

FIG. 3 is a schematic representation of a third non-limitative embodiment of a device for manipulating a light radiation. The device (300) shown in FIG. 3 comprises all the components of the device (100) in FIG. 1. The only difference is that the first zone (141) and the second zone (142) are parallel to the surface (140). Because the first zone (141) is not in a tilted position, the injecting light radiation (110) needs to have such a non-zero incident angle to enable the extraction of the output light radiation (120) from the second zone (142) after several reflections.

The device (300) comprises a monolithic block (301) made of a bulk dispersive media, inside which the refractive index is a function of the optical wavelength. Since the incident angle of the light radiation (110) is not zero, the refraction angles of the light radiations with different wavelengths are different due to the chromatic dispersion effect at the interface. As the radiations propagate inside the monolithic block (301), the angle difference leads to a spatial separation of the optical paths for light radiations with different wavelength.

In order to simplify the illustration, only two different wavelength light radiations with separated optical paths are presented in the FIG. 3. In the real utilization of multi-frequency radiations, the angle/spatial separation depends on the wavelength differences between the radiations. The solid line represents the light beam with the first wavelength, which is reflected at the positions (1301, 1302, 1303 and 1304) on the reflective layer (133). While the dashed lines represent the light radiation with the second wavelength, different from the first one, which is reflected at the positions (1305, 1306 and 1307) on the reflective layer (133). As explained in the first embodiment, since the surface 130 has a microstructured surface at the level of each reflection position (1301-1307), each separated reflection position (1301-1307) can have an independent and different spatial phase profile to modify the spatial phase of the radiation at each reflection position. In addition, the imparted spatial phase depends on the index of refraction, which is also wavelength dependent. Thus, the light radiation with different wavelengths can be manipulated separately and independently. After several reflections, the radiations with different wavelengths are extracted at the second zone (142).

The separation of light radiations with different wavelengths can also be realized in the cavity configuration shown in the FIG. 2 with one plane surface and one curved surface forming the cavity. The injecting light radiation (110) needs to have such a non-zero incident angle relative to the zone (241) to enable the extraction of the light radiation 120 after manipulation from the same zone (241).

Figure 4:
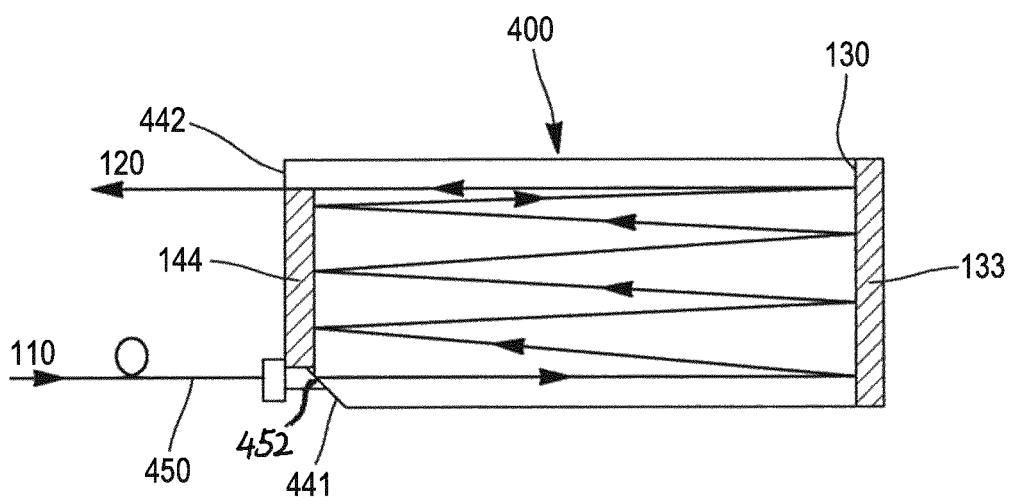
FIG. 4 is a schematic representation of a fourth embodiment of a device according to the present disclosure.

FIG. 4 is a schematic representation of a fourth non-limitative embodiment of a device 400 for manipulating a light radiation. The cavity configuration can be any one of those described with reference to FIGS. 1-3. Different from the embodiments in FIGS. 1-3, in which the light radiation is provided to the block by free propagation, FIG. 4 shows an embodiment in which the light radiation is provided from an optical fiber (450). The first zone (441) and/or the second zone (442) serve(s) as interfaces between the optical fiber and the cavity. The optical fiber can either be attached directly to the interface or via a certain type of intermedium. The advantage of the method of direct attachment is the improvement of stability and compactness.

One example of direct attachment is by adhesive bonding. In this process, the optical fiber is bonded using an adhesive directly to the first and/or second zone. According to the different profiles of the fiber ending, typically in the form of PC, UPC or APC, the interfaces need to be processed to have correspondingly different forms to accommodate the different profiles of the fiber ending. As shown in FIG. 4, the fiber may end with the form of an angled physical contact (452). Correspondingly, the first zone (441) is cut with such an accommodating angle. It is preferred to use an adhesive whose refractive index matches the one of the material of the monolithic block. Besides, it is also possible to bond the fiber ending to the monolithic block via an intermedium, for example, a piece of transparent material as a bridge.

The light radiation emitted out of the optical fiber diverges as it propagates. The phase manipulating surface (130) can realize a function of shaping the light radiation by imparting a spatial phase transformation on the divergent light radiation.

It is also possible to add at least one optical component between the optical fiber and the monolithic block to shape the light radiation. One example is a microlens to collimate the light radiation out of the optical fiber. However, all other sizes and divergences of the light radiation are possible to be realized by all types of optical components disposed at different longitudinal and transversal positions.

In the paragraphs above, different structures of the device for manipulating a light radiation are presented. In the following paragraphs, the fabrication of each component of the device will be explained.

The monolithic block is made of homogenous substrate material, which presents high transmissions for the applied wavelengths. In order to have a high thermal stability, it is also expected to present a low coefficient of thermal expansion. Different kinds of material such as glasses, or polymers, or ceramics, or even semiconductors, which fulfill the above criteria, can be used as a substrate material for the fabrication of the monolithic block.

In the case of the first and the second embodiments, in which the light radiation follows the same optical path, the monolithic block is preferably made of material with low chromatic dispersion coefficients to avoid the separation as a function of the different wavelengths of the light radiations. This is especially useful in telecommunications applications, at the wavelength region of 1500-1600 nm.

In the case of the third embodiment, it is preferable to use the materials with high chromatic dispersion coefficients to effectively separate the optical paths for the light radiations with different modes, especially different wavelengths.

The surfaces of the substrate material may be microstructured using various fabrication processes, for example, machining, etching, pressing or molding, to achieve a required form.

One specific characteristic of the substrate material is birefringence. There is a kind of material, for which the birefringence is an intrinsic characteristic, e.g., quartz or calcite. There is also another kind of material for which the birefringence is an induced characteristic, e.g., a polymer under mechanical stress.

Depending on the incident angle to the monolithic cavity, a light radiation can either propagate in the same optical path, or be split into different optical paths by different polarizations. As the optical radiations propagate along different optical paths, there are also second-order spatial separations when they are reflected by the phase manipulating surface of the cavity. As explained before, each separated reflection position can have an independent and different spatial phase profile to modify the spatial phase of the light radiation as a function of its mode parameter, like wavelength or polarization. Thus, the light radiation with different polarizations can be manipulated separately and independently.

In all the above-discussed embodiments and examples, the cavity is made of only one phase manipulating surface. It is also possible to have both the reflective surfaces of the cavity made of phase manipulating microstructured surfaces. Thus, the reflections on each surface impart a spatial phase transformation on the light radiation.

In the above embodiments, the reflection is realized by the high-reflective coating on the surfaces, such as a dielectric coating, or a metallic coating.

The reflection can also be realized by the total internal reflection, which depends on the index of refraction of the material of the monolithic block and the incident angle of the light beam.

Figure 5:
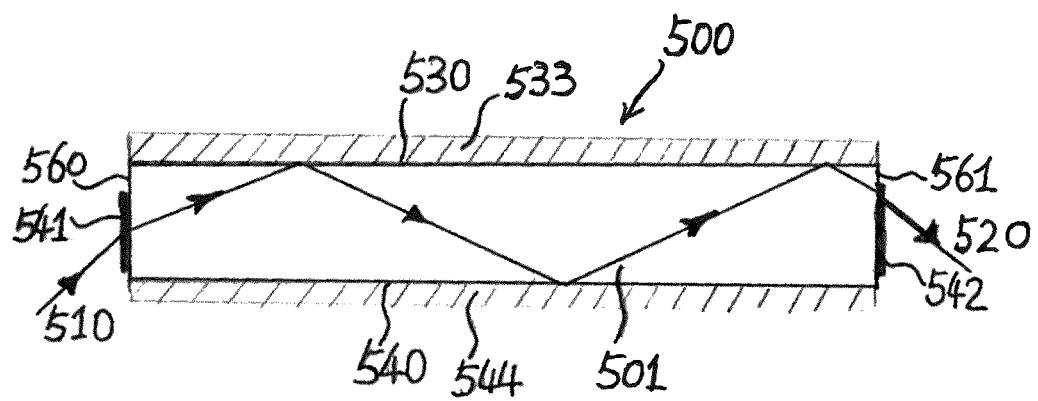
FIG. 5 is a schematic representation of a fifth embodiment of a device according to the present disclosure.

FIG. 5 is a schematic representation of a fifth non-limitative embodiment of the device for manipulating a light radiation. The device (500) shown in FIG. 5 comprises a monolithic block (501) made of homogenous transparent material, which has a high index of refraction compared to the outside medium layers (533 and 544) at the interface. The monolithic block (501) is in the form of a parallelepiped with two parallel plane surfaces (530 and 540). The side surfaces (560 and 561) are covered by antireflection coatings to form, respectively, a first zone (541) for injecting the light radiation (510), and a second zone (542) for extracting the light radiation (520). The incident angle at the first zone (541) is so large that the refracted light radiation hits the parallel plane surface (530) at an angle that is larger than the critical angle for the total internal reflection so that the light radiation is reflected several times between the parallel plane surfaces (530 and 540) inside the monolithic cavity.

The invention claimed is:

1. A device for manipulating a light radiation, the device comprising:
   a monolithic block made of homogenous transparent material and having two reflective surfaces, wherein the light radiation is manipulated by being reflected multiple times on the two reflective surfaces, the monolithic block including:
      a first zone on one surface of the monolithic block for injecting the light radiation to be manipulated, and
      a second zone on one surface of the monolithic block for extracting the light radiation after manipulation,
      wherein at least one of the two reflective surfaces is micro-structured to impart a determined spatial phase transformation on the light radiation at each reflection on micro-structurations of the at least one of the two reflective surfaces that is micro-structured.

2. The device of claim 1, wherein the first zone and the second zone are separated and interchangeable.

3. The device of claim 1, wherein the first zone and the second zone are merged into a unique one.

4. The device of claim 1, wherein the first zone and the second zone are disposed on the same surface of the monolithic block.

5. The device of claim 1, wherein the first zone and the second zone are disposed on different surfaces of the monolithic block.

6. The device of claim 1, wherein the first zone and the second zone are each configured to be in tilted positions with an angle alpha relative to one of the two reflective surfaces so as to have a zero incident angle for injecting the light radiation and a zero output angle for extracting the light radiation from the monolithic block.

7. The device of claim 1, wherein the first zone and/or the second zone is (are) configured to be aligned with one of the two reflective surfaces in order to have a non-zero incident angle for the light radiation injecting inside the monolithic block so that different wavelengths of light radiations are separated due to the chromatic dispersion effect.

8. The device of claim 1, further comprising at least one optical fiber or fiber array assembled to the first zone and/or the second zone.

9. The device of claim 8, further comprising at least one optical component configured to manipulate a size and a divergence of the light radiation emitting out of the optical fiber.

10. The device of claim 8, further comprising at least one microlens to collimate the light radiation emitting out of the optical fiber.

11. The device of claim 8, wherein the at least one optical fiber or fiber array is bonded to the first zone and/or second zone of the monolithic block and a reshaping of the light radiation out of the optical fiber is performed by the at least one of the two reflective surfaces that is micro-structured.

12. The device of claim 8, wherein the at least one optical fiber is bonded to the first zone and/or second zone of the monolithic block via an intermedium.

13. The device of claim 8, wherein the at least one optical fiber is bonded to the first zone and/or second zone of the monolithic block by a liquid having the same index of refraction as the material of the monolithic block.

14. The device of claim 1, wherein the material of the monolithic block exhibits birefringence.

* * * * *